May 24, 1938.  L. B. PENDLETON  2,118,520
MOVABLE AUTO TOP
Filed Oct. 7, 1936   2 Sheets-Sheet 1

Inventor:
L. Baylor Pendleton

May 24, 1938.  L. B. PENDLETON  2,118,520
MOVABLE AUTO TOP
Filed Oct. 7, 1936  2 Sheets-Sheet 2
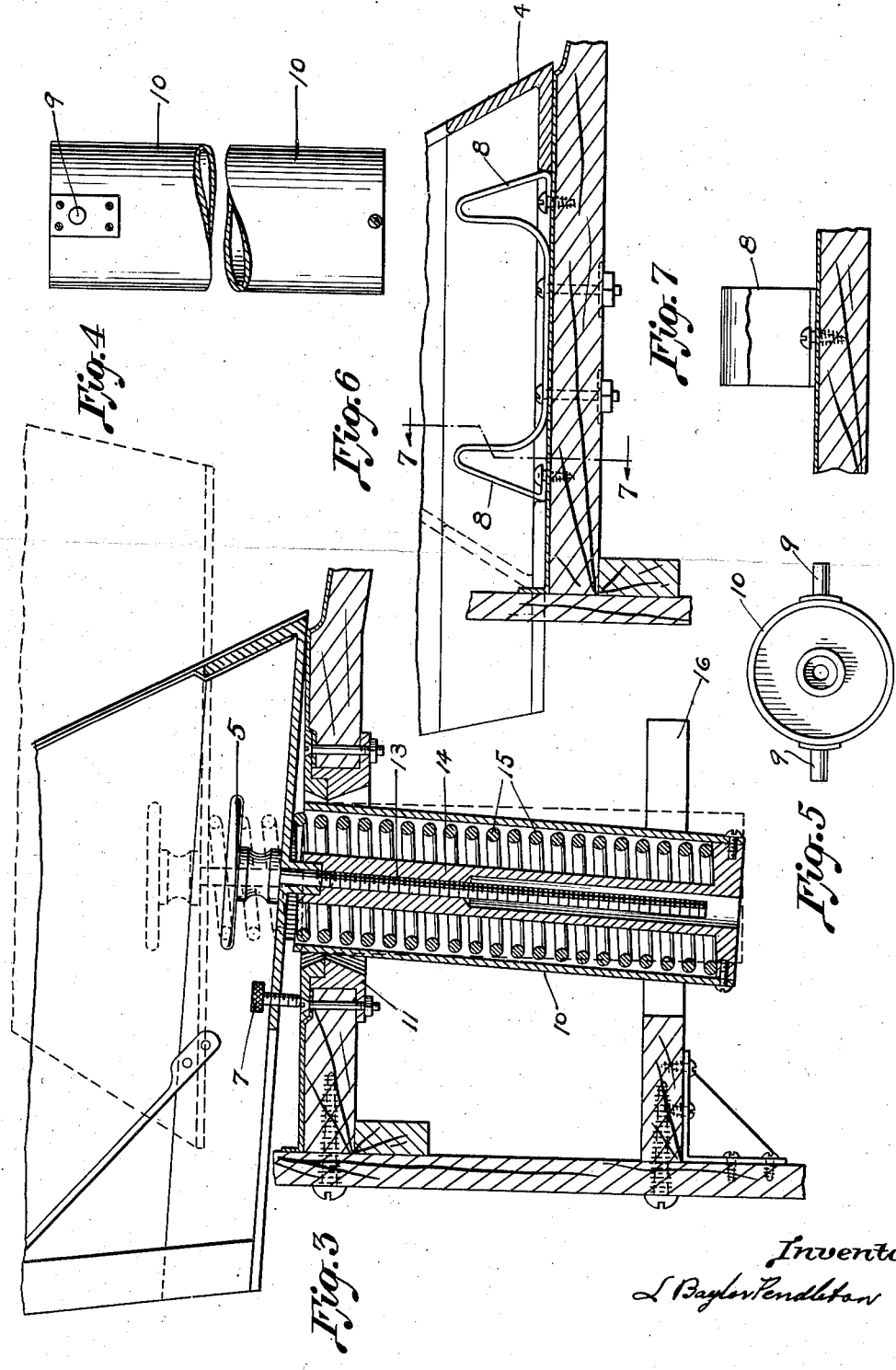
Inventor
L Baylor Pendleton Patented May 24, 1938

2,118,520

UNITED STATES PATENT OFFICE 2,118,520

MOVABLE AUTO TOP

Louis Baylor Pendleton, St. Louis, Mo.

Application October 7, 1936, Serial No. 104,425

4 Claims. (Cl. 296—102)

This invention relates to motor vehicle tops and more especially to the type top having a rigid or fixed shape and being movably mounted upon a vehicle body structure.

Among the outstanding objects of this invention is the novel provision for rotating or reversing laterally a fixed shape top and means for attaching same to and for holding or clamping same rigidly against a vehicle body structure in a plurality of predetermined positions, said operating means being wholly concealed from outside view.

The purpose of rotating or reversing laterally said top being, broadly, to provide quick and easy means for covering and uncovering the driver's compartment with said top wherewith to effectively protect the occupants of said compartment from sun or inclement weather, or to provide, optionally, an entirely open or uncovered compartment in which to ride.

Many drivers of motor vehicles prefer driving at certain seasons of the year, or at least certain hours of the day, in open and uncovered compartments, while at other seasons or other hours, they prefer closed or covered compartments. It is, therefore, highly desirable to provide a top not only easily and quickly convertible to meet this urgent requirement for frequent changes, but one offering the maximum in safety protection to its occupants and the maximum in stability and durability. Heretofore the conventional, collapsible or foldable type top has been generally employed for the purpose of these frequent change requirements, but said foldable type top is insecurely constructed when folded, offers no safety protection whatever to the occupant of the vehicle in case of an accident of the upset type and in addition to this deficiency the collapsible top requires much time and effort to operate, and because of the constant folding and unfolding, the fabric of said top deteriorates quite rapidly, causing leaks and great unsightliness, whereas the present invention provides a strongly framed top of a fixed or unfoldable type remaining in an upright position at all times thereby affording a degree of protection regardless of whether it faces forwardly or rearwardly, and its rigid, unfoldable form practically eliminates all wear and tear. The very simple operating means employed reduces the effort required to manipulate it to a minimum, a few turns of a release wheel and a half turn of the top structure itself, and the shift from one position to another is quickly and easily accomplished.

Where a rumble seat is incorporated within the vehicle body the present top when rotated rearward acts as a convenient covering for said rumble seat, but the incorporation of a rumble seat is in nowise necessary to the proper working of the invention.

While the accompanying drawings illustrating my invention show the operation of elevating and rotating the top to be manually accomplished the application of motive power would in no wise be a departure from the present invention.

As a still further object the invention comprehends means for mounting the top, said means rendering the top adaptable for ready attachment to or detachment from the vehicle body structure and further provides swivel means for rotating the top structure laterally upon a vertical axle movably attached to said body structure, said axle pivoting in an eccentrically positioned orifice located in a somewhat bow shaped horizontal cross brace or strut attached preferably to the side wall members of the top structure at or near the base of said side walls whereby an eccentric movement is imparted to the top structure whenever rotated, changing said structure's position upon the body structure with every degree of rotation. I prefer that the bow shaped horizontal cross brace or strut be positioned at or near the base of the top and shaped to conform to the desired contour of said top, and serve as a means for attaching the fabric or covering at said base. I also prefer that the said cross brace or strut likewise conform horizontally to the contour of the deck of the body structure upon which it is movably mounted, thereby assuring a snug fit against said deck when locked or clamped thereto. To eliminate the possibility of squeaks I prefer to cover this cross brace or strut with felt or other soft material.

A still further object of the invention is to provide simple means for elevating the top structure vertically to a point where it can rotate above the back of the driver's seat or other interference and after the operation be lowered again and made fast and secure to the body structure. While I prefer to accomplish this raising and lowering operation by means of a manually operated threaded member co-operating with a spring held in compression, a rack and pinion or other elevating device could be employed without departure from the present invention.

A still further object of the invention is to provide a simple means for tilting or rocking forwardly or rearwardly the entire top structure without collapsing, folding or distorting same. By this means the driver's compartment, while employing the top above same, may, by a slight tilt upwards, be provided with any degree of ventilation and still further, this tilting device makes possible the easy access to and from a rumble seat should one be provided and the top be disposed rearward. If so desired the top may, when rearwardly disposed, be tilted downward sufficiently to considerably reduce wind resistance.

A still further object of the invention is the provision of an adjustable means for maintaining at various angles of adjustment, in either rotated or tilted positions, a rigid, fixed shape top strongly framed and movably mounted upon a body structure in such a way as to afford maximum safety protection to the occupants of the vehicle in the event of an upset; top which will be durable and efficient in use and simple and easy to manufacture and one which can be placed upon the market and associated with a motor vehicle at a low cost; top which will in no way detract from the attractive design of the vehicle but rather enhance it; top which can be either covered with fabric or metal sheet without injuriously affecting its purpose, use or appearance.

With these and other obvious objects in view the invention consists not only in its novel construction, arrangement and formation of parts, but in its novel operation as well, all as hereinafter more specifically described in these specifications and as illustrated in the accompanying drawings, embodying one preferred principle of constructing same.

Fig. 3 is an enlarged cross sectional view on line 3—3 Fig. 2.

Fig. 4 is an enlarged fragmentary view of the cylinder housing the raising and lowering device.

Fig. 5 is an enlarged plan view of the cylinder housing the operating device.

Fig. 6 is a cross section on line 6—6 Fig. 2 showing in elevation the stays for maintaining alignment of top.

Fig. 7 is a cross section thru the stays for maintaining alignment of top.

Figure 1:
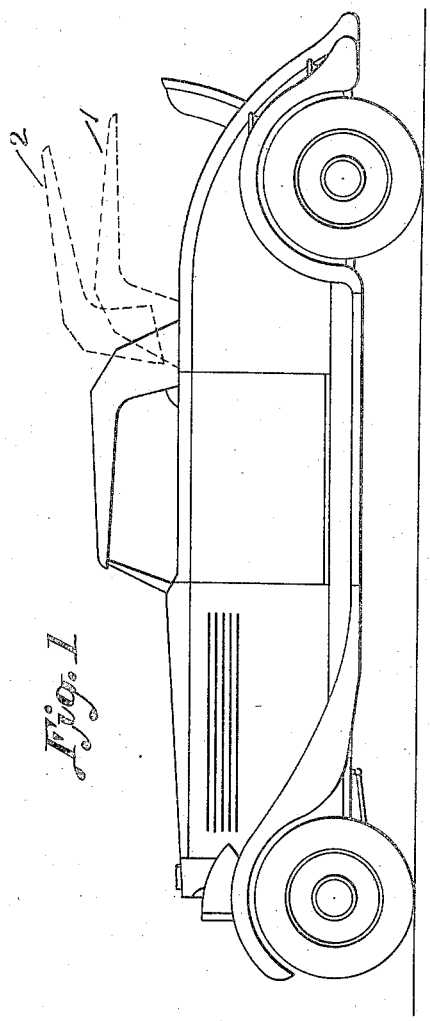
Fig. 1 is a side elevation of an automobile equipped with my improved rotating top, showing same in its normal or forward position above the driver's compartment with the reverse position indicated in dotted lines.

Referring to the accompanying drawings in greater detail: In Fig. 1 the solid lines show my top in place above the driving compartment of a conventional type roadster. When the door windows of such a roadster are racked up the compartment becomes entirely enclosed. Rearward of the driver's seat and concealed within the area enclosed by said top is located a swivel mounting device as shown in Fig. 3. The dotted lines 1 in Fig. 1 show my top rotated one-half turn laterally, thus completely uncovering the driver's compartment. Fig. 1 also shows the tilting action of said top in dotted lines 2.

Figure 2:
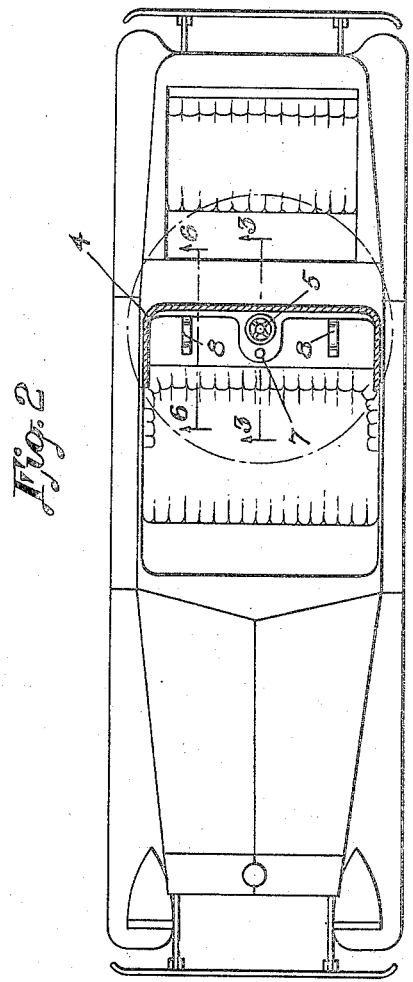
Fig. 2 is a plan view looking down upon a longitudinal section of the bow shaped cross brace or strut engaged at its ends to the top structure. The operating device is shown in plan elevation and the dotted lines indicate the arc required for rotating the top.
Figure 8:
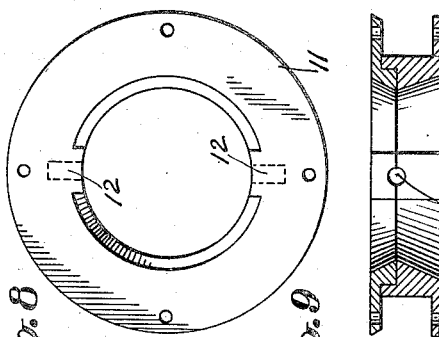
Fig. 8 is a plan view of the top member of the mounting ferrule.
Figure 9:
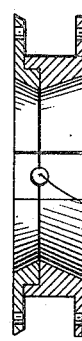
Fig. 9 is a section thru the mounting ferrule.
Figure 10:
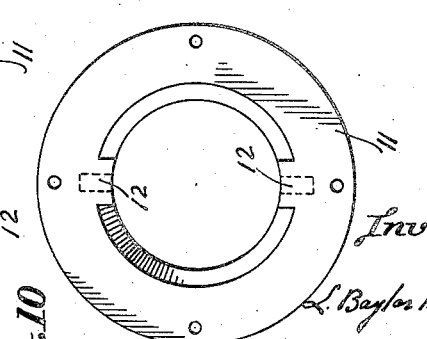
Fig. 10 is a plan view of the bottom member of the mounting ferrule.

In Fig. 2 a plan of the body of a conventional roadster is shown with the top structure cut away to show the position of the swivel mounting device 5 and the bow shaped cross strut 4 positioned at the base of the top structure having its ends securely engaged thereto at its side portions, the swivel 5 being positioned on a center line lengthwise of the strut 4 and considerably off center crosswise said strut 4 whereby an eccentric movement is imparted to top structure when rotated upon said swivel moving same forward on the body.

In Fig. 3 an enlarged cross sectional view thru the swivel mounting device is shown. 13 being a shouldered threaded shaft passing thru a shouldered orifice eccentrically positioned in the bow-shaped cross strut 4. Engaging rod 13 is a threaded core 14 encased by and attached to a housing cylinder 10. Threaded shaft 13 is operated by hand wheel 5. As wheel 5 is turned to the left compression spring 15 forces cross strut 4, together with top structure engaged to it upward permitting same to rotate freely above body interference. When hand wheel 5 is turned to the right, cross strut 4 is forced downward, compressing spring 15 and clamping cross strut 4 rigidly to the body deck. Compression spring 15 surrounds core 14 and is entirely encased and supported by cylinder 10. Cylinder 10 is movably mounted to the body deck by means of rocker arms 9 engaging ferrule 11 through journals 12 permitting a forward and backward swing. Thus when the top structure is tilted forward or backward the mounting device tilts with it. 16 is a furcated guide to prevent undue sidewise strain on rocker arms 9 caused from wind pressure. 7 is a thumb screw for maintaining the top at any degree of tilted adjustment. In Figs. 6 and 7 are shown my preferred method of holding the top structure in aligned position on the body structure thus eliminating all undue strain from the mounting device. Stays 8 are positioned right and left of the mounting device and are fashioned with a face slightly inclined to obviate binding when the top structure is clamped downward on the body deck. I prefer that these stays 8 be somewhat resilient for taking up possible play, thereby eliminating all squeaks or rattle that otherwise might take place.

It will appear that the foregoing specific description relates to a presently preferred example, selected only by way of illustration, and not of limitation of my invention. It is obvious that a number of changes may be made in the construction and operation of the various parts without departing from the spirit and scope of the invention as defined by the claims hereunto appended.

I claim as my invention:

1. A mounting device, adapted for attaching adjustably a vehicle top to a vehicle body, said device having a ferrule adapted to be clamped to the body deck and journaled to receive rocker arms attached to mounting device permitting a swinging movement on rocker arms forwardly and backwardly with top as it is tiltingly operated.

2. A vehicle body, the combination of an integral vehicle top structure capable of lateral rotation about a vertical axis associated with a mounting device attached to deck of said vehicle body, said axis having lower end portion thereof threadedly engaged to said mounting device and upper portion thereof journaled for engaging top structure through a journal box, shoulder of said journal box being also journaled into a bearing positioned vertically in mounting device and adapted to stabilize top in its vertical position.

3. A vehicle body, a driver's seat disposed in a permanently transverse position relative to the body, a unitary top structure consisting of a rigid roof connected at two or more of its outward margins by rigid depending supports, and including a horizontal strut element spaced transversely beneath the roof and integrally bridging said depending supports, and being entirely separate from said seat, a pivot assembly connecting the vehicle body and said integrally formed strut element of the top structure, whereby a horizontally reversed position of said unitary top structure with respect to said seat is permitted, said movement adapted to totally cover and uncover said seat selectively.

4. The combination of a vehicle body and top structure as recited in claim 3, means associated therewith tending to exert a continuous upward pressure upon the horizontal strut element of the top structure, and tending to lift the top structure vertically above the body to facilitate the reversed adjustment thereof.

L. BAYLOR PENDLETON.